United States Patent [19]
Kunick et al.

[11] Patent Number: 5,526,181
[45] Date of Patent: Jun. 11, 1996

[54] DYNAMIC ABERRATION CORRECTOR FOR CONFORMAL WINDOWS

[75] Inventors: Joseph M. Kunick, Redondo Beach; Chungte W. Chen, Irvine; Lacy G. Cook, El Segundo; Anthony S. Lau, Culver City, all of Calif.

[73] Assignee: Hughes Aircraft Company, Los Angeles, Calif.

[21] Appl. No.: 179,597

[22] Filed: Dec. 22, 1993

[51] Int. Cl.$^6$ .............................. G02B 27/00; H01J 3/14; F41G 7/00
[52] U.S. Cl. .......................... 359/613; 359/708; 250/234; 250/236; 244/3.16
[58] Field of Search .................... 359/613, 708; 250/234, 236; 244/3.16

[56] References Cited

U.S. PATENT DOCUMENTS

| | | | |
|---|---|---|---|
| 2,502,543 | 4/1950 | Warmisham | 359/708 |
| 2,719,457 | 10/1955 | Tripp | 359/708 |
| 3,296,443 | 1/1967 | Argyle | 244/3.16 |
| 4,086,000 | 4/1978 | Cox et al. | 359/708 |
| 5,140,608 | 8/1992 | Karpol et al. | 359/708 |
| 5,161,051 | 11/1992 | Whitney et al. | 244/3.16 |

OTHER PUBLICATIONS

Schulte; "Prime Focus Correctors Involving Aspherics"; Applied Optics Feb. 1966, vol. 5, No. 2 pp. 313–317.

Primary Examiner—Georgia Y. Epps
Assistant Examiner—Evelyn A. Lester
Attorney, Agent, or Firm—M. W. Sales; W. K. Denson-Low

[57] ABSTRACT

A method and apparatus (30) for compensating for optical aberration created by a conformal window (60). The apparatus (30) comprises a one-dimensional corrector plate (32) for providing a varying amount of linear coma, first and second cylindrical lenses (34, 38) for providing a varying amount of astigmatism and a system for adjusting the corrector plate (32) and the lenses (34) and (38) to minimize the optical aberration created by the conformal window. The apparatus (30) of the present invention provides for correction of considerable amounts of optical aberration over a wide field of regard. The apparatus is simple in design, easy to install and cost effective.

17 Claims, 6 Drawing Sheets

| ELEVATION (DEG) | AZIMUTH (DEG) | DECENT DISPLACE (INCH) | LENS SEPARATION (INCH) | LENS ROTATION (DEG) |
|---|---|---|---|---|
| 0 | 0 | 0 | 0.325 | 0 |
| 20 | 0 | 0 | 0.289 | 0 |
| 35 | 0 | 0 | 0.194 | 0 |
| 55 | 0 | 0 | 0.050 | 0 |
| 0 | 10 | 0.116 | 0.325 | 0.023 |
| 0 | 20 | 0.235 | 0.325 | 0.005 |
| 0 | 30 | 0.353 | 0.325 | 0.204 |
| 0 | 40 | 0.468 | 0.325 | 0.025 |
| 0 | 50 | 0.575 | 0.325 | 0.663 |
| 20 | 10 | 0.117 | 0.289 | 0.109 |
| — | — | — | — | — |
| — | — | — | — | — |
| — | — | — | — | — |
| 35 | 20 | 0.201 | 0.194 | −0.006 |
| — | — | — | — | — |
| — | — | — | — | — |
| — | — | — | — | — |
| 55 | 30 | 0.232 | 0.050 | −0.003 |
| — | — | — | — | — |
| — | — | — | — | — |
| — | — | — | — | — |
| 55 | 50 | 0.369 | 0.050 | 0.148 |

*TYPICAL LOOK UP TABLE FOR ABERRATION GENERATOR. VALUES ARE DETERMINED BY PARAMETERS SUCH AS THICKNESS, INDEX, CURVATURE, AND TILT OF CONFORMAL WINDOW.*

DYNAMIC ABERRATION CORRECTOR FOR CONFORMAL WINDOWS

FIELD OF THE INVENTION

The present invention is directed to a method and apparatus for correcting optical aberrations created by conformal windows. More specifically, the present invention is directed to a method and apparatus for providing a dynamic optical solution for correcting such optical aberrations resulting from the presence of such windows.

BACKGROUND OF THE INVENTION

Aircraft-borne optical sensors must be isolated from the environment to function properly and to preserve the aerodynamic efficiency of the aircraft design. This isolation is usually accomplished by placing the sensor behind a window. The window must be designed to provide the proper field of regard for the sensor. That is meant by the field of regard is the complete set of ordered pairs of values representing azimuth and elevation viewing angles through which the sensor can be pointed or gimbaled. In context of this specification, this is in contradistinction to the field of view which corresponds to the locus of points which the sensor can instantaneously observe given a particular orientation within the field of regard. Typically, the field of view of an optical sensor is significantly smaller than its field of regard.

Aircraft window design for isolating optical sensors is driven by two considerations: maintaining the aerodynamic efficiency of the overall aircraft design and the need to render the field of regard of the sensor as free of optical distortion and aberration as is practicable.

Conformal windows, which are windows having contours matching those of the surrounding surface of the aircraft in the context of the present application, offer the most favorable aerodynamic shape for maintaining the overall efficiency of the aircraft design. However, conformal windows create considerable optical aberration which varies greatly as the sensor is gimbaled or pointed through the field of regard.

As a consequence of the considerable optical aberration created by conformal windows and the difficulty of correcting such widely varying amounts of aberration, designers of on-board sensor systems typically prefer to use flat or spherical windows to protect sensors from the airborne environment. Although the use of non-conformal windows benefits the sensor designer, the aircraft suffers from increased resistance as a result of this design choice.

The principal types of optical aberration associated with conformal windows are coma and astigmatism. What is meant by coma in the context of the present application is the variation of magnification as a function of the aperture. Also in the context of the present application, astigmatism is the difference in focus location for fans of rays in the sagittal and tangential planes.

In previously known systems, the problem of correcting coma and astigmatism due to the use of a conformal window has not been resolved by optical means. A device for generating optical aberration has been previously disclosed, e.g. see *Aberration Generator* by R. A. Buchroeder and R. Brian Hooker, Journal of Applied Optics (1975), however this device provides limited amounts of optical aberration when compared to the amounts of optical aberration required in the context of the present invention. For this reason, the aberration generator disclosed in the above-mentioned reference is inadequate for the present application. As above mentioned, absent an acceptable optical solution to aberration-correction, designers are forced to use flat or spherical windows as above mentioned. Because these window designs reduce aerodynamic efficiency, smaller windows may be used to limit aerodynamic degradation. As a result, the sensor field of regard is limited.

What is needed is a system which provides an optical solution to the problem of correcting the optical aberration which results from the use of conformal windows in the isolation of aircraft-borne sensor systems, and, thus, allow for increased choices in aircraft window design. The system should be simple, easy to install and cost effective. The present system addresses such a need.

SUMMARY OF THE INVENTION

The present invention is directed toward compensating for the optical aberration created by a conformal aerodynamic window having a generally cylindrical shape. The present invention comprises a one-dimensional corrector plate for providing a varying amount of coma, the corrector plate has aspherical deviations in one direction only and is capable of being displaced in a direction perpendicular to an optical axis of the system. The corrector plate further has an axis of bilateral symmetry while lacking an axis of rotational symmetry. The system of the present invention further comprises a pair of cylindrical lenses for providing a varying amount of astigmatism, the cylinder lenses being a matched set such that one has negative optical power while the other has positive optical power of the same magnitude. The spacing between the two cylinder lenses is capable of being increased or decreased, and the rotational orientation of the cylinder axes can also be varied. The present invention additionally comprises a controller responsive to the optical aberration created by the conformal window and coupled to the coma providing means and to the astigmatism providing means for varying the amount of coma provided by the one-dimensional corrector plate and the amount of astigmatism provided by the cylindrical lenses such that the optical aberration created by the conformal window is minimized.

The aberration corrector of the present invention has significant advantages over previously known systems. Varying amounts of coma and astigmatism may be created by the aberration corrector of the present invention over a very large field of regard. Further, each type of aberration can be independently generated by adjusting the positions of the one-dimensional corrector plate and the above discussed. Thus, an optical solution to the problems of aberrations generated by conformal windows is possible through the use of the present invention.

Since the present invention provides an optical solution to the correction of coma and astigmatism created by a conformal window, sensors may be designed which have larger fields of regard. Also, design options for windows which protect sensors are increased to allow for the design of conformal aircraft windows which could not have been used previously as a result of the aberrations they produce. Consequently, the aerodynamic efficiency of the aircraft design is preserved.

DETAILED DESCRIPTION

The present invention is directed toward an improvement for correcting optical aberrations created by a conformal window. The following description is presented to enable one of ordinary skill in the art to make and use the invention and is provided in the context of a particular application and its requirements.

It is to be understood that various modifications to the preferred embodiment will be readily apparent to those skilled in the art, and the generic principles defined herein may be applied to other embodiments. Thus, the present invention is not intended to be limited to the embodiment shown, but is to be accorded the widest scope consistent with the principles and novel features disclosed herein.

Figure 1:
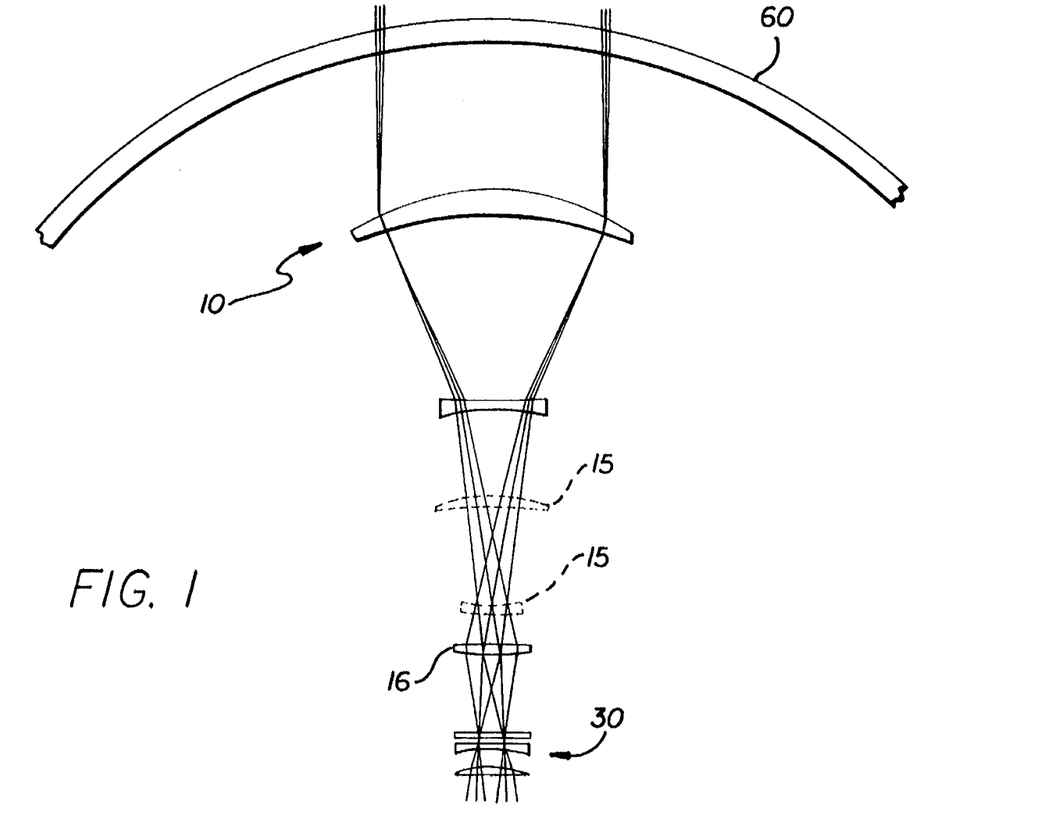
FIG. 1 shows an optical sensor in combination with an aberration corrector in accordance with the present invention in the look-forward position.

Referring now to FIG. 1, what is shown is an azimuth-plane view of an optical sensor 10 in the form of a telescope isolated from the environment by a conformal window 60. Drop-in lenses 15 which permit the sensor to have a wide field of view mode are represented by dashed lines. The aberration corrector of the present invention 30 is located substantially near to the exit pupil 16 of the sensor 10. In this figure, the sensor 10, in combination with the aberration corrector 30, is in the look-forward position.

Figure 2:
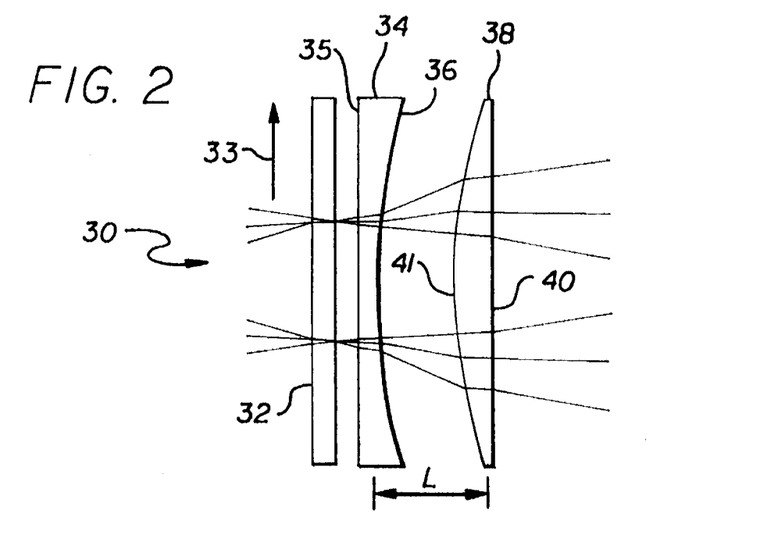
FIG. 2 shows an azimuth-plane view of the aberration corrector of FIG. 1 in the look-forward position.

The aberration corrector 30 of the present invention in the look-forward position is shown in greater detail in FIG. 2. In this embodiment, a one-dimensional corrector plate 32 and the two complementary cylindrical lenses 34, 38 are shown. The one-dimensional corrector plate 32 of a preferred embodiment of the present invention is a plane-parallel plate containing no paraxial optical power, but the corrector plate 32 does have aspheric surface deviations in one direction.

As shown in FIG. 2, the position of the corrector plate 32 of the present invention is varied to provide coma which compensates for that created by the conformal window 60. The corrector plate 32 provides the proper amount of coma to compensate for that created by the conformal window 60 by being decentered from the optical axis of the aberration corrector 30. What is meant by decentering the corrector plate 32 in the context of the present application is the displacement of the corrector plate 32 a distance $x_d$ 33 in a direction perpendicular to the optical axis of sensor 10. The greater the decentering displacement 33, the greater the compensating coma created by the corrector plate 32.

Figure 3:
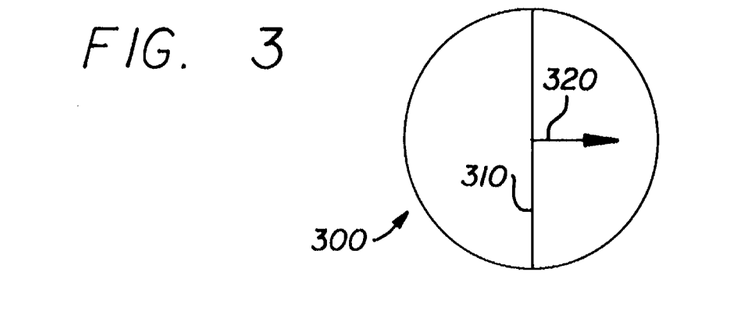
FIG. 3 shows the displacement of the one-dimensional corrector plate of the present invention from its normal position.

Referring now to FIG. 3, what is shown is an illustration of the decentering of the corrector plate 32 of FIG. 2. The vertical line 310 represents an axis parallel to the aspheric surface deviations. Thus, it is seen that the corrector plate 32 has an axis of bilateral symmetry, meaning that the left side corrector plate 32 looks exactly like the right side. However, the corrector plate 32 lacks an axis of rotational symmetry.

The arrow 320 represents a direction in which the corrector plate is to be displaced to provide coma. It should be understood that the displacement of the corrector plate is always perpendicular to the axis 310, and not parallel to the axis 310. In the embodiment herein disclosed, the surface deviations of the one-dimensional corrector plate is given by the mathematical expression A multiplied by $x^4$, where x is the distance in the direction indicated by arrow 320 from the point of intersection of line 310 and arrow 320. In this expression A is a design constant.

Figure 4:
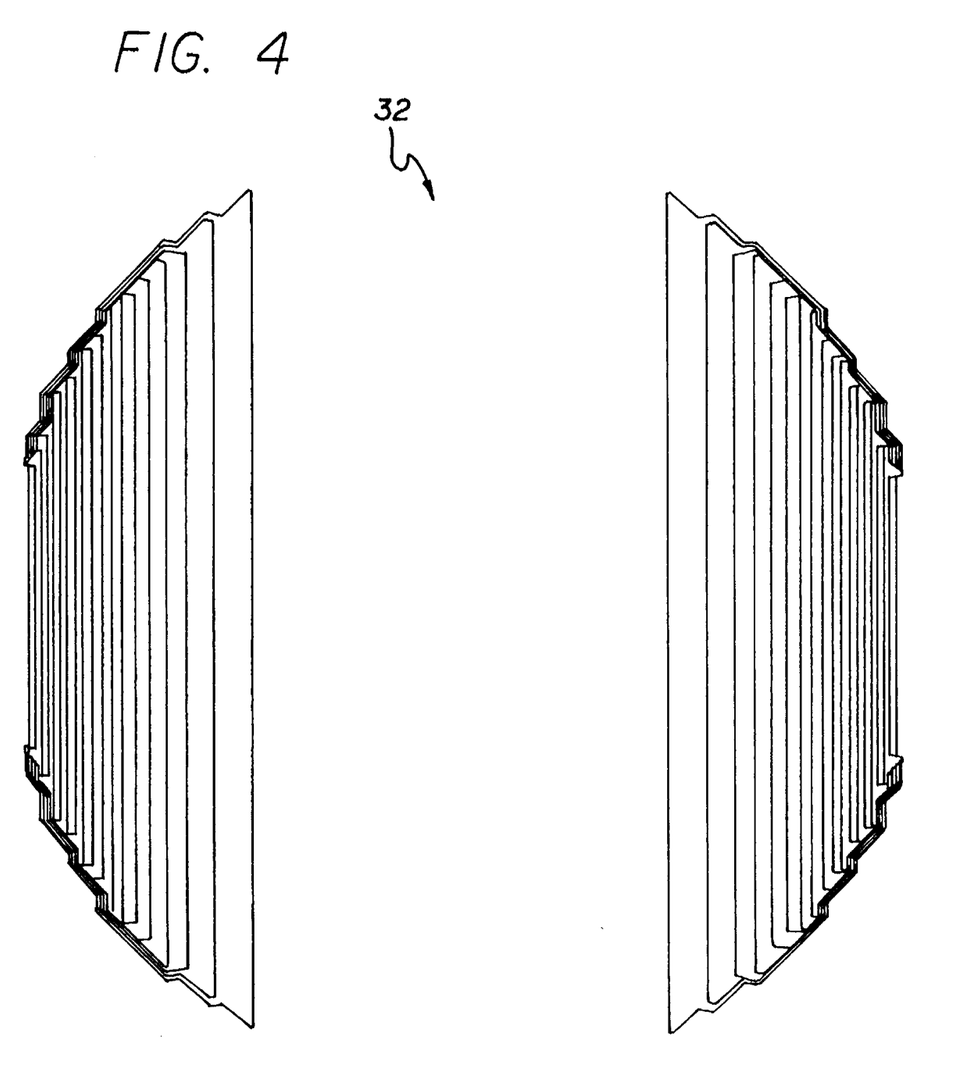
FIG. 4 is a contour plot of the one-dimensional corrector plate.

FIG. 4 is a contour plot of the one-dimensional corrector plate 32 of the present invention. The contour lines of the plot represent constant values of surface deviation or sag according to the equation previously described. The axis of bilateral symmetry 310 is vertical in this figure. The edges of the plot are not smooth as a result of undersampling error.

In some applications, the coma correction can be accomplished with two corrector plates, where each plate has approximately the same amount but opposite algebraic sign of aspheric deviations in one direction. When the two plates are moved in the opposite directions, only coma is created. The lower and higher order astigmatism are balanced out.

Each of the cylindrical lenses 34, 38 of the present invention has one planar surface and one generally cylindrical surface. The generally cylindrical shape is a result of the cylindrical surface having two different radii of curvature. The plane including each radius of curvature is perpendicular to the other. Consequently, the lenses 34, 38 of the combination have an optical axis but do not have an axis of rotational symmetry.

The first astigmatic lens 34, then, is a plano-concave cylindrical lens having a planar surface 35 and a generally concave cylindrical surface 36. The first lens 34 can be understood to provide astigmatism in the following way.

Light rays which are parallel when impinging upon the planar surface 35 of the first lens 34 would emerge from the concave surface 36 along paths which tend to diverge. If the optical axis of the lens 34 were an axis of rotation, rays impinging on the planar surface 35 parallel to a vertical plane would diverge as much as rays impinging parallel to a horizontal plane. However, since the cylindrical shape of the concave surface 36 means the optical axis of the first lens 34 is not an axis of rotation, upon emerging from the concave surface 36 of the first lens 34 rays impinging on the planar surface 35 parallel to a vertical plane will show a different amount of divergence than those rays which impinge upon the planar surface 35 of the first lens 34 in a horizontal plane. Therefore, a small, bright point object will appear to be more cylindrical in shape. The distortion of the point object into the more cylindrical shape of the image is in the plane defined by the larger of the two radii of curvature.

The second lens 38 is a plano-convex cylindrical lens having a planar surface 40 and a convex surface 41 having a generally cylindrical shape.

In a manner similar to the first lens 34, the second lens provides astigmatism by causing light rays which impinge upon the convex surface 41 of the lens to experience different amounts of divergence upon emerging from the planar surface 40 depending upon the radius of curvature in the parallel plane. Although each of the lenses 34, 38 has the same two radii of curvature in a preferred embodiment, thus the lenses 34, 38 are complementary, it is to be understood that the lenses 34, 38 need not be strictly complementary in order to operate within the spirit and scope of the present invention. In fact, there may exist applications which require that the lenses 34, 38 not be strictly complementary. However, when the lenses 34, 38 are complementary and the axial separation between the lenses 34, 38 is zero, the lenses 34, 38 are in contact and provide no optical power.

In the subsequent discussion the principles of the present invention will be discussed in the context of several specific positions which the sensor may occupy within the field of regard. It should be understood that these are but a few of the various positions which the sensor may occupy and that the principles discussed below apply equally to the positions not discussed herein. It should be further understood that although inches are used as a measure of distance in the embodiment herein presented, this particular measure of distance is used for illustrative purposes only and that other measures of distance may be employed without departing from the spirit of the present invention.

One of ordinary skill in the art should also understand that the particular distances utilized in the discussion of the present invention are dependent upon the actual size of the particular corrector plate 32 and the lenses 34, 38. In this context, size is understood to mean, in addition to the physical dimensions of the particular corrector plate 32 and the lenses 34, 38, also the shape of a particular element which, in part, gives rise to the optical power each element 32, 34, and 38 provides to the aberration corrector 30 of the present invention.

Referring again to FIGS. 1 and 2, in the look-forward position, the aberration corrector 30 produces no coma but a significant amount of astigmatism. This is seen by referring to FIG. 5, which presents a typical look-up table for a conformal window chosen as an illustrative example. In this table, the first two columns 510, 520, respectively, give values for elevation and azimuth pointing angles in degrees, the coordinates by which a particular position of the sensor within the field of regard is determined. Subsequent columns 530, 540, and 550, respectively, provide values for displacement of the corrector plate 32, for axial separation of the cylindrical lenses 34, 38 and for rotation of the cylindrical lenses 34, 38. The former two columns 530, 540 provide data in inches, the latter column 550 provides data in degrees.

Figure 5:
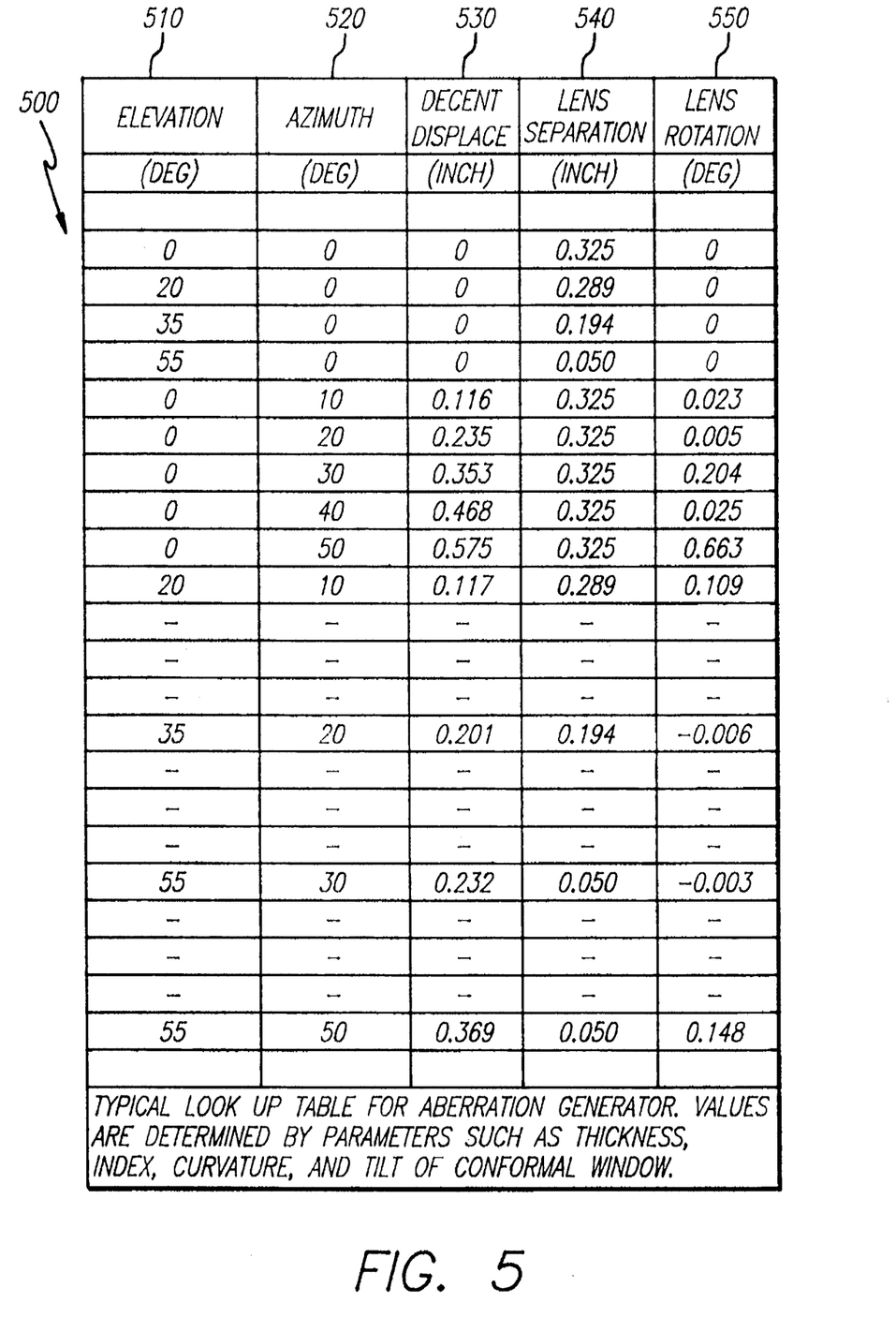
FIG. 5 shows a typical look-up table such as might be used by a controller to configure the elements of the aberration corrector of the present invention.

As above mentioned, the particular values in these columns 530, 540, and 550 are determined by the size of the particular corrector plate 32 and the cylindrical lenses 34, 38 where size also is taken to include the optical power each element 32, 34, and 38 of the corrector 30 supplies. Moreover, the particular values of the decentering displacement column 530, lens separation column 540, and lens rotation column 550, which appear in the look-up table 500 are also determined by the shape of the window 60, the index of refraction of the material from which it is constructed and the thickness of the window 60. Therefore, the various entries will change depending upon the choices for these parameters made by one skilled in the art.

In the look-forward position, as above mentioned, the window 60 creates no coma, but the window 60 does create a significant amount of astigmatism. The look-forward position is found in the table 500. The position of the sensor is found by referring to the elevation column 510 and the azimuth column 520 to be zero (0) degrees elevation and zero (0) degrees azimuth. In this position, the decentering displacement 530 is given as zero (0) inches. However, to compensate for the astigmatism created by the window 60, the cylindrical lenses 34, 38 are axially separated by 0.325 inches as shown in column 540.

Figure 6:
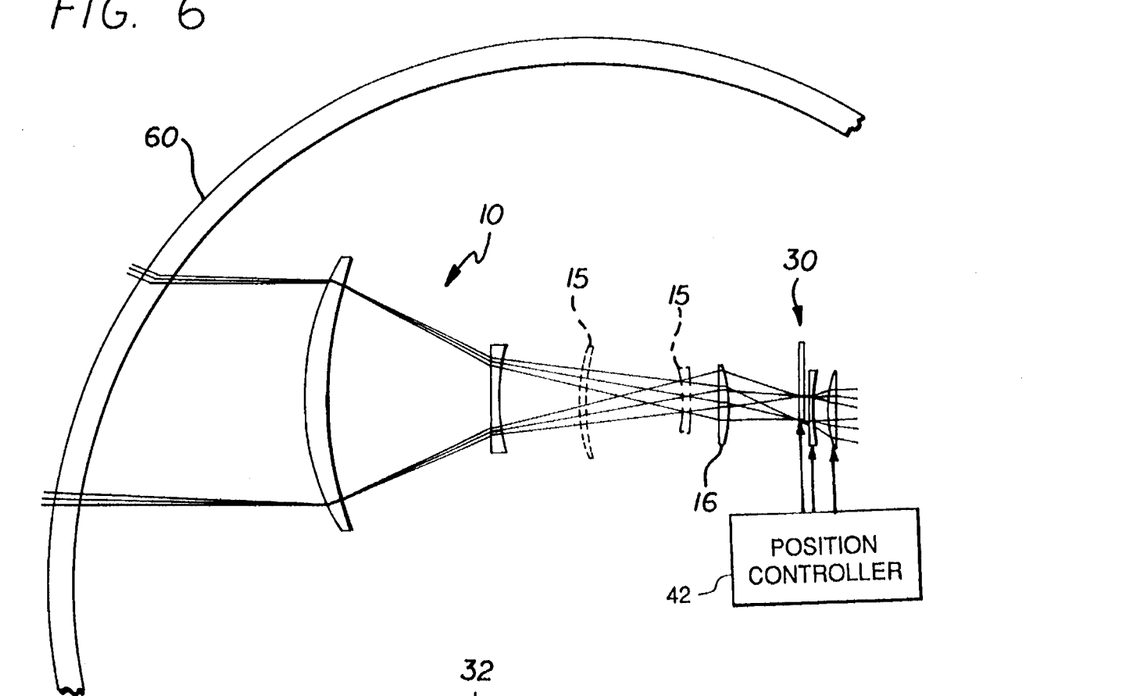
FIG. 6 shows an azimuth-plane view of an optical sensor in combination with an aberration corrector in accordance with the present invention in the extreme look-left position.
Figure 7:
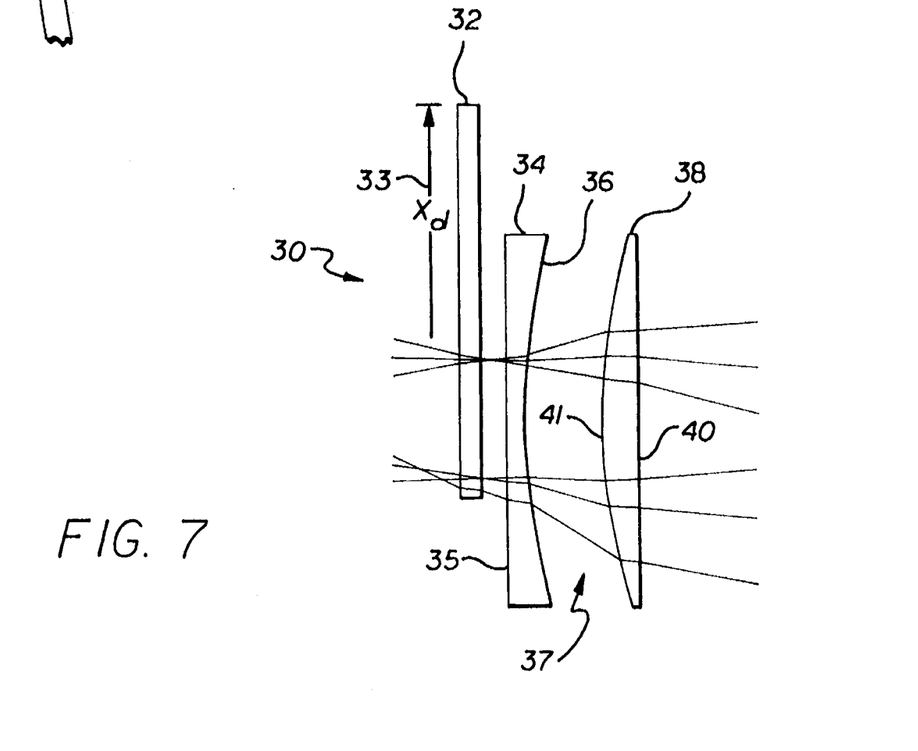
FIG. 7 shows the aberration corrector of FIG. 6 in the extreme look-left position.

Referring now to FIG. 6, the sensor 10 is shown in the extreme look-left position. In this position, the conformal window 60 creates considerable amounts of coma and astigmatism as will be discussed below. FIG. 7 shows in greater detail the elements of the aberration corrector 30 in the extreme look-left position.

Referring back to FIG. 5, in the extreme look-left position, the position of the sensor is found, by referring to the elevation column 510 and the azimuth column 520, to be zero (0) degrees elevation and fifty (50) degrees azimuth, for example. It is to be understood by one of ordinary skill in the art that since the window 60 is generally cylindrical in shape, the window 60 creates the same amounts of astigmatism in the negative azimuth region as in the positive azimuth region. Therefore, an azimuthal measurement of minus fifty (−50) degrees must result in the same amount of astigmatism as a measurement of fifty (50) degrees. With this understanding, the corrector plate 32 must be decentered by 0.575 inches from the optical axis of the exit pupil 16.

Further, since the window 60 creates considerable amounts of astigmatism with the sensor 10 in the extreme look-left position, the lenses 34, 38 are axially separated by 0.325 inches and must be rotated about their 34, 38 common axis of rotation by 0.663 degrees.

It should be noted that the proper amount of coma and of astigmatism are provided by a controller 42 (FIG. 6) which varies the positions of the corrector plate 32, and the lenses 34, 38. There could be a variety of devices that could be utilized to vary the positions of the elements 32, 34, 38 of the aberration corrector 30 of the present invention. For example, the device could be similar to the device utilized to vary the position of the lens in a zoom camera lens system.

Figure 8:
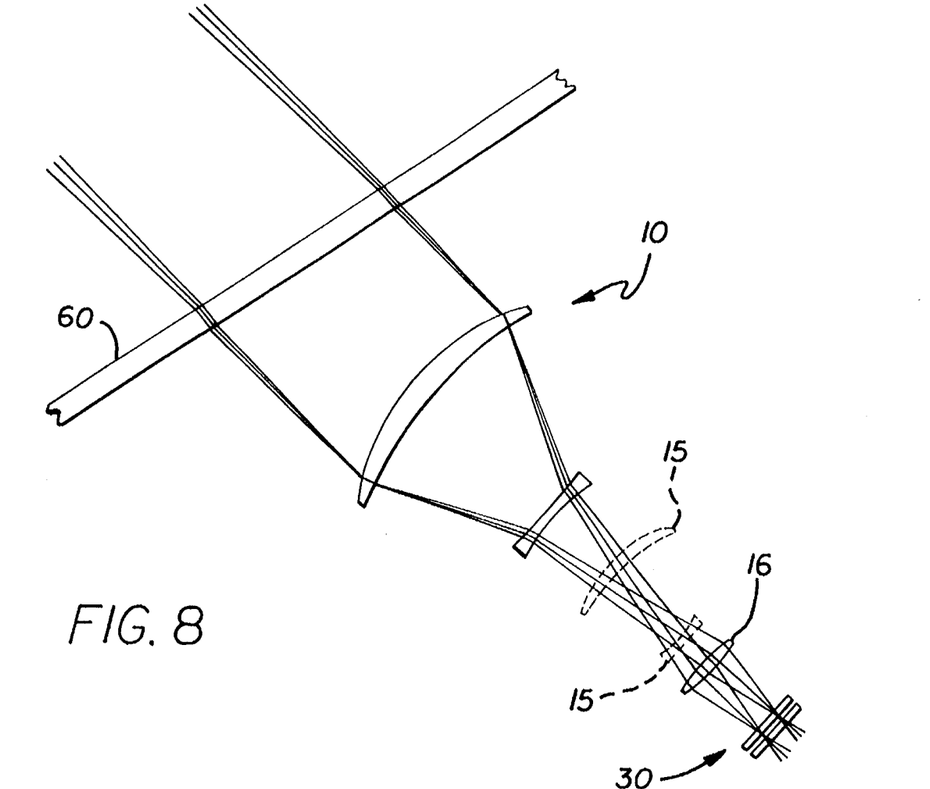
FIG. 8 shows an elevation-plane view of an optical sensor in combination with an aberration corrector in accordance with the present invention in the extreme look-up position.

Referring now FIG. 8, the sensor 10, in combination with the aberration corrector 30, is shown in an elevation-plane view. The sensor 10 is in the extreme look-up position. Note that in the elevation-plane view the cylindrical shape of the lenses 34, 38 is not apparent.

Figure 9:
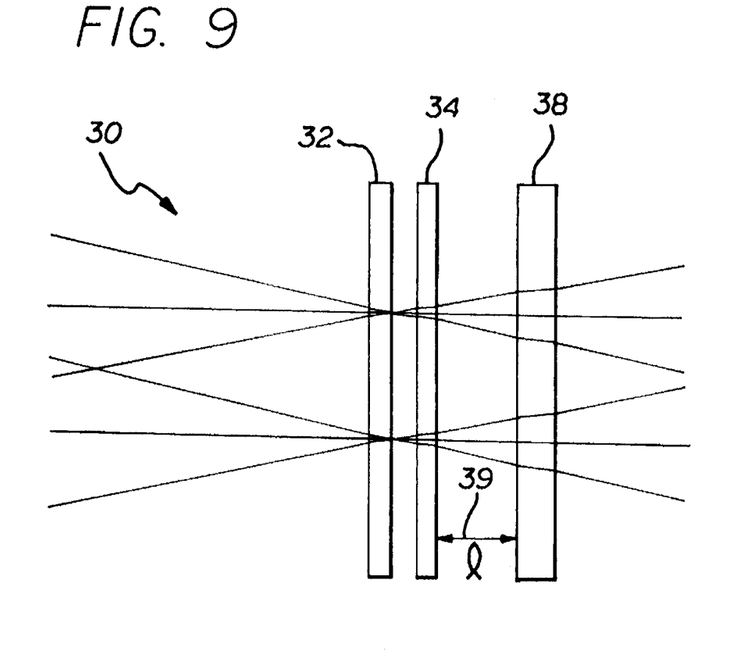
FIG. 9 shows the aberration corrector of FIG. 8 in the extreme look-up position.

Referring now to FIG. 9, the positions of the corrector plate 32 and the lenses 34, 38 are shown in the extreme look-up position. In the extreme look-up position, the window 60 creates no coma. However, the window 60 does produce considerable astigmatism in this position.

As above discussed, the amount of astigmatism produced by the corrector 30 is determined by the axial separation 39 of the two lenses 34, 38. When no astigmatism is created by the window 60 in the sensor, the lenses 34, 38 have zero axial separation. The combination 34, 38 introduces no optical power into either the azimuthal or elevation plane. However, as more astigmatism is produced by the conformal window 60, the astigmatic lenses 34, 38 are moved farther apart so that the lenses 34, 38 produce more optical power.

In the extreme look-up position, as above discussed, the conformal window 60 creates considerable astigmatism. Therefore, axial separation of the astigmatic lenses 34, 38 is increased. Referring again to FIG. 5, in the extreme look-up position, the position of the sensor 10 in the field of regard is found, by referring to the elevation column 510 and the azimuth column 520, to be fifty-five (55) degrees elevation and zero (0) degrees azimuth. In this position, the look-up table 500 provides decentering displacement 33 of zero (0) inches. Thus, the window 60 creates no coma in the extreme look-up position.

Additionally, the amount of astigmatism created by the window 60 in this position is small. The look-up table 500 provides a lens separation of 0.050 inches from column 540 for the axial separation 39 of the lenses 34, 38. As in the case of the look-forward position above discussed, the look-up table 500 provides a lens rotation of zero (0) degrees via column 550 about the common optical axis of the lenses 34, 38.

Figure 10:
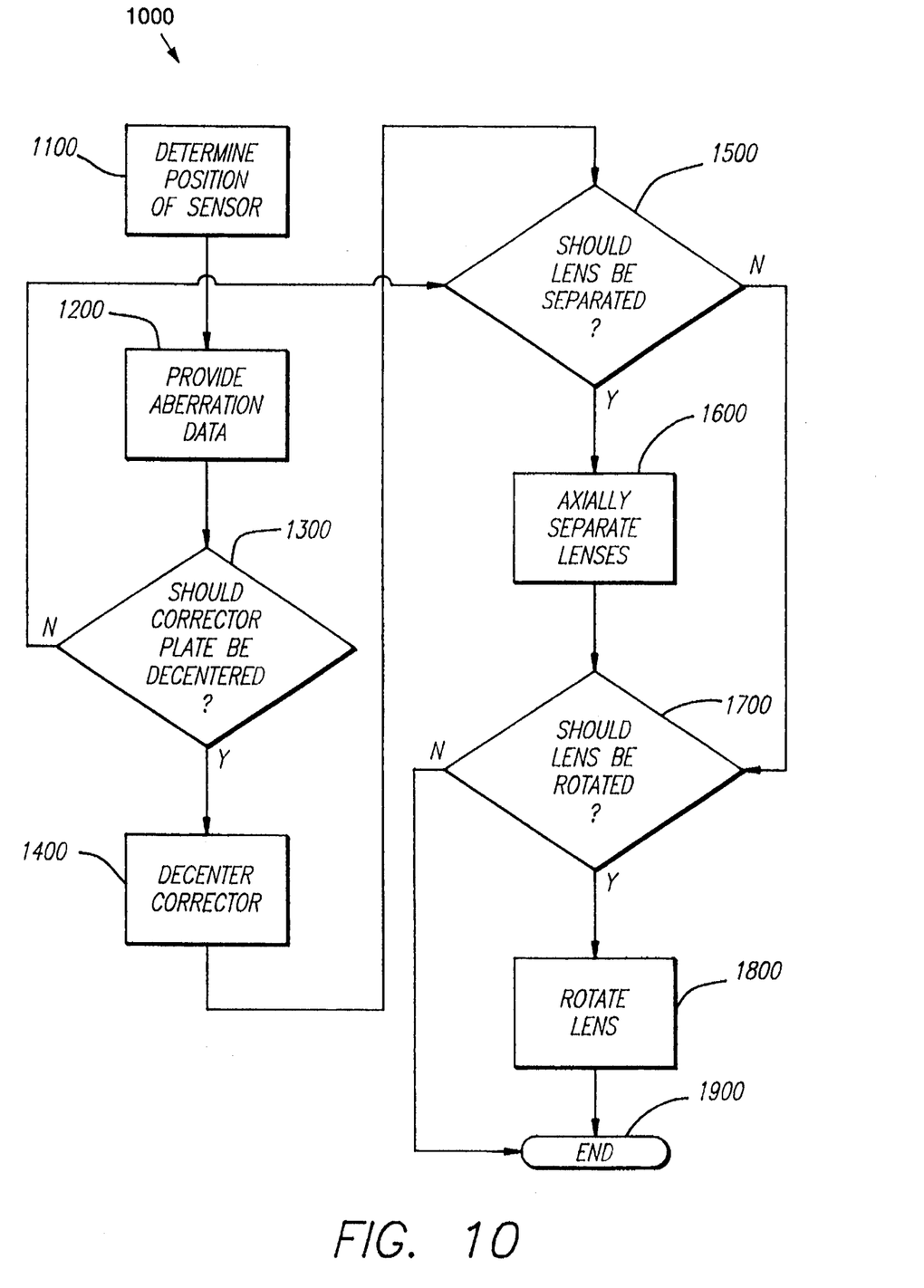
FIG. 10 shows a flow chart illustrating the method that the controller means might use for configuring the elements of an aberration corrector in the accordance with the present invention.

FIG. 10 is a flow chart 1000 of a general method for configuring the elements 32, 34, 38 of the aberration corrector to eliminate optical aberration created by the conformal window 60. The position of the sensor in the field of regard is determined, via step 1100. Thereafter the aberration data are provided via step 1200. For example, the data can be obtained from the look-up table of FIG. 5 for the appropriate decentering displacement, lens separation and lens rotation. As above discussed, the corrector displacement, lens separation and rotation are determined by the shape of the conformal window 60, the index of refraction of the material from which it is constructed and its thickness.

Next, a determination is made as to whether the corrector plate 32 should be displaced from its present position, via step 1300. If the position of the corrector plate 32 should be changed, the corrector plate 32 is then displaced via step 1400. Next, it is determined whether the lenses 34, 38 should be separated, via step 1500. On the other hand, if at step 1300 the position of the corrector plate 32 does not need to be changed, the determination of required axial separation is made via step 1500. In either case, the next step is to determine if the lenses 34, 38 need to be separated.

If it is determined that the lenses 34, 38 are to be separated, via step 1500, the separation of the lenses is changed via step 1600. Next, the determination of whether the lenses 34, 38 should be rotated is made via step 1700. If, on the other hand, the separation of the lenses 34, 38 does not need to be changed, the determination of whether the lenses 34, 38 should be rotated is made next via step 1700. In either case, the next step is to determine if the lenses 34, 38 should be rotated.

If, via step 1700, it is determined that the lenses 34, 38 must be rotated, the lens rotation is carried-out via step 1800. Then, the process ends via step 1900. If it is determined via step 1700 that the lenses 34, 38 need not be rotated, the process ends via step 1900. In either case, the process of configuring the corrector plate 32 and the lenses 34, 38 responsive to the position determined via step 1100 ends at the next step via step 1900.

As an example of the above described process, consider the case wherein the sensor 10 is in the extreme look-left position as shown in FIG. 6.

Referring to FIG. 5 in conjunction with FIG. 10, in the extreme look-left position the sensor 10 elevation is given as zero (0) degrees via column 510. The azimuth will be minus fifty (−50) degrees via column 520. There is no entry in the look-up table 500 for these coordinates, but, due to the bilateral symmetry of the window 60, the astigmatism produced by azimuth fifty (50) degrees must be the same as the astigmatism produced by azimuth minus fifty (−50) degrees. Therefore, at step 1100, the position is found to be the same as elevation zero (0) degrees and azimuth fifty (50) degrees. Then, at step 1200, the decentering displacement, column 530, the lens separation, column 540, and the lens rotation, column 550, are provided by the look-up table 500.

Via step 1300 it is determined that the corrector plate 32 must be displaced. Then the corrector plate 32 is displaced 0.575 inches from the optical axis of the sensor 10.

Subsequent to displacing the corrector plate, it is determined, via step 1500, that the lenses 34, 38 should be separated. In this example, the lenses 34, 38 are to be axially separated by a distance 39 of 0.325 inches via step 1600.

Then it is determined, via step 1700, whether the lenses 34, 38 should be rotated to alter the orientation of the astigmatism provided by the lenses 34, 38. Here, it is determined that the lenses should be rotated by 0.663 degrees, via step 1800. Subsequent to rotating the lenses 34, 38, the process of configuring the elements 32, 34, 38 ends with step 1900.

In the context of the present invention, the optical aberration created by the conformal window 60 results in distortion of the signal wave front measured by the root-mean-square wave front error (RMS WFE). In the extreme look-left position of the example just discussed, the uncorrected RMS WFE measured is 53.20 micrometers ($\mu$m). When corrected by use of the aberration corrector 30 and the process embodied in FIG. 10, the residual RMS WFE is 0.38 $\mu$m.

From the above example, it is clear that the aberration corrector 30 of the present invention allows for significant correction of optical aberration created by a conformal window 60. Thus, the aberration corrector 30 of the present invention independently provides coma and astigmatism as needed to compensate for that created by a conformal window 60. Although a look-up table 500 provides the compensating coma and astigmatism data in the embodiment herein discussed, one of ordinary skill in the art will understand that a means which, for example, performs a calculation based upon the shape of the conformal window 60 and the position of the sensor 10 in the field of regard would provide a second embodiment of the invention herein disclosed.

It will be further understood that a bias amount of astigmatism may be introduced into the aberration corrector 30 of the present invention by changing one of the cylindrical radii slightly. This versatility allows one of ordinary skill in the art more freedom in correcting the aberrations of a particular system. Thus, it is seen that this invention allows the flexibility to independently produce various amounts of coma and astigmatism to compensate for the requirements of a particular application.

It is understood the above-described embodiments are merely illustrative of the possible specific embodiments which can represent applications of the principle of the present invention. Other arrangements may be readily devised in accordance with these principles by one of ordinary skill in the art without departing from the spirit and scope of the present invention. The scope of the invention is limited only by the following claims:

What is claimed is:

1. A system for compensating for optical aberration created by a conformal window, the system comprising:

one-dimensional corrector plate for providing a varying amount of coma, the corrector plate comprising a plane parallel plate having aspherical surface deviations in one direction, the corrector plate further having an axis of bilateral symmetry, the corrector plate further lacking an axis of rotational symmetry; the corrector plate further capable of being displaced in a direction perpendicular to an optical axis of the system;

means for providing a varying amount of astigmatism; and controller means responsive to the optical aberration created by the conformal window and coupled to the one-dimensional corrector plate and to the astigmatism providing means for varying the amount of coma provided by the one-dimensional corrector plate and the amount of astigmatism provided by the astigmatism providing means such that the optical aberration created by the conformal window is minimized.

2. The system according to claim 1 wherein the one-dimensional corrector plate has surface deviations according to the equation A multiplied by $x^4$, x being the distance along the surface of the corrector plate from the optical axis of the system, and A being a design constant.

3. The system according to claim 1 wherein the astigmatism providing means comprises at least a first and a second cylindrical lens.

4. The system according to claim 3 wherein the first cylindrical lens comprises a plano-concave lens having a substantially planar first surface and a substantially cylindrically-shaped concave second surface.

5. The system according to claim 4 wherein the second cylindrical lens comprises a plano-convex lens having a substantially planar fourth surface and a substantially cylindrically-shaped convex third surface.

6. The system according to claim 1 wherein the controller means comprises means for decentering the one-dimensional corrector plate from the optical axis of the system responsive to the optical aberration created by the conformal window.

7. The aberration corrector according to claim 3 wherein the controller means further comprises means for axially separating the first cylindrical lens from the second cylindrical lens and for rotating the lenses about a common optical axis responsive to the optical aberration created by the conformal window.

8. In a system comprising an optical sensor and a conformal window, the optical sensor having a field of regard, the system further including an aberration corrector for compensating for optical aberration created at every position within the field of regard of the sensor by the conformal window, the aberration corrector comprising:

one-dimensional corrector plate for providing a varying amount of coma, the corrector plate comprising a plane parallel plate having aspherical surface deviations in one direction, the corrector plate further having an axis of bilateral symmetry, the corrector plate further lacking an axis of rotational symmetry; the corrector plate capable of being displaced in a direction perpendicular to an optical axis of the aberration corrector;

means for providing a varying amount of astigmatism, the astigmatism having an orientation; and means responsive to a created optical aberration coupled to the one-dimensional corrector plate and to the astigmatism providing means for varying the amount of the coma provided by the one-dimensional corrector plate and the astigmatism provided by the astigmatism providing means such that the optical aberration created by the conformal window is minimized.

9. The aberration corrector according to claim 8 wherein the one-dimensional corrector plate has surface deviations according to the equation A multiplied by $x^4$, x being the distance along the surface of the corrector plate from an optical axis of the sensor and A being a design constant.

10. The aberration corrector according to claim 8 wherein the controller means comprises means for decentering the one-dimensional corrector plate from an optical axis of the aberration corrector.

11. The aberration corrector according to claim 8 wherein the astigmatism providing means comprises at least a first and a second cylindrical lens.

12. The aberration corrector according to claim 11 wherein the first cylindrical lens comprises a plano-concave lens having a substantially planar first surface and a substantially cylindrically-shaped concave second surface.

13. The aberration corrector according to claim 11 wherein the second lens comprises a plano-convex lens having a substantially planar fourth surface and a substantially cylindrically-shaped convex third surface.

14. The aberration corrector according to claim 11 wherein the controller means further comprises means for axially separating the first cylindrical lens from the second cylindrical lens and for rotating the lenses about a common optical axis.

15. In an optical sensor assembly including an optical sensor, the optical sensor having a field of regard, and an aberration corrector, the aberration corrector for compensating for optical aberration created in the field of regard of the sensor by a conformal window, the aberration corrector comprising:

one-dimensional corrector plate for providing a varying amount of coma, the corrector plate comprising a plane parallel plate having aspherical surface deviations in one direction, the corrector plate further having an axis of bilateral symmetry, and the corrector plate lacking an axis of rotational symmetry; the corrector plate further capable of being displaced in a direction perpendicular to an optical axis of the optical sensor assembly;

first cylindrical lens, the first cylindrical lens comprising a substantially planar first surface and a substantially concave second surface, the concave second surface having first and second mutually perpendicular planes of curvature;

second cylindrical lens coupled to the first lens for providing a varying amount of astigmatism, the second cylindrical lens comprising a substantially planar fourth surface and a substantially convex third surface, the convex third surface having the first and the second mutually perpendicular planes of curvature; and controller means responsive to a created optical aberration coupled to the one-dimensional corrector plate and to the first and second cylindrical lenses for varying the amount of the coma provided by the one-dimensional corrector plate and for varying the amount of astigmatism provided by the astigmatism providing means such that the optical aberration created by the conformal window is minimized.

16. A method for compensating for optical aberration created by a conformal window in an optical sensor assembly, the optical sensor assembly including an optical sensor having a position in a field of regard and an aberration corrector, the aberration corrector including a one-dimensional corrector plate and first and second cylindrical lenses; the method comprising the steps of:

(a) determining the position of the sensor within the field of regard;

(b) providing aberration data responsive to the position of the sensor in the field of regard;

(c) determining if the corrector plate should be decentered;

(d) decentering the corrector plate if it is determined that the corrector plate should be decentered;

(e) determining if the cylindrical lenses should be separated;

(f) separating the lenses if it is determined the lenses should be separated;

(g) determining if the cylindrical lenses should be rotated; and (h) rotating the lenses about a common optical axis if it is determined that the lenses should be rotated.

17. A system for compensating for optical aberration created by a conformal window, the system comprising:

a first and second one dimensional corrector plates for providing a varying amount of coma; the first and second corrector plates further comprising two plane parallel plates having approximately the same amount and opposite algebraic signs of aspherical deviations in one direction; the first and second corrector plates being capable of being displaced one with respect to the other; the first and second corrector plates also being capable of being displaced with respect to an optical axis; and controller means for varying the amount of coma provided by the first and second corrector plates such that the optical aberration created by the conformal window is minimized.

* * * * *